United States Patent [19]

Toles

[11] 4,152,694
[45] May 1, 1979

[54] GUIDE FOR AIDING IN BACKING-UP VEHICLES

[76] Inventor: Perry G. Toles, 123 Lawrence, Portia, Ark. 72457

[21] Appl. No.: 849,862

[22] Filed: Nov. 9, 1977

[51] Int. Cl.$^2$ .............................................. B60Q 1/48
[52] U.S. Cl. ........................................ 340/87; 340/91; 362/83; 180/1 AP
[58] Field of Search .................... 340/61, 70, 87, 91, 340/100, 104, 135; 343/711, 715, 721, 894; 362/80, 82, 83; 180/1 AP, 97, 103 R

[56] References Cited

U.S. PATENT DOCUMENTS

| 3,439,326 | 4/1969 | Boudin | 340/87 |
| 3,998,285 | 12/1976 | Cooper | 180/1 AP |

Primary Examiner—Alvin H. Waring

[57] ABSTRACT

The guide for aiding in backing-up vehicles includes an extensible and retractable element preferably provided on the right rear fender portion of the vehicle. When the transmission of the vehicle is placed in reverse, the guide is automatically extended to serve as a visual aid in backing up the vehicle. When the vehicle transmission is placed in any other position, the guide is retracted.

3 Claims, 4 Drawing Figures

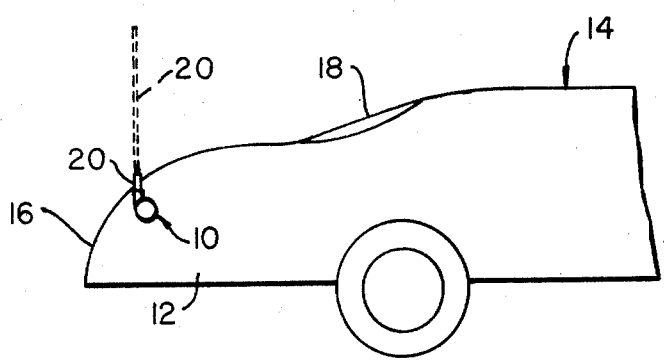
FIG.1
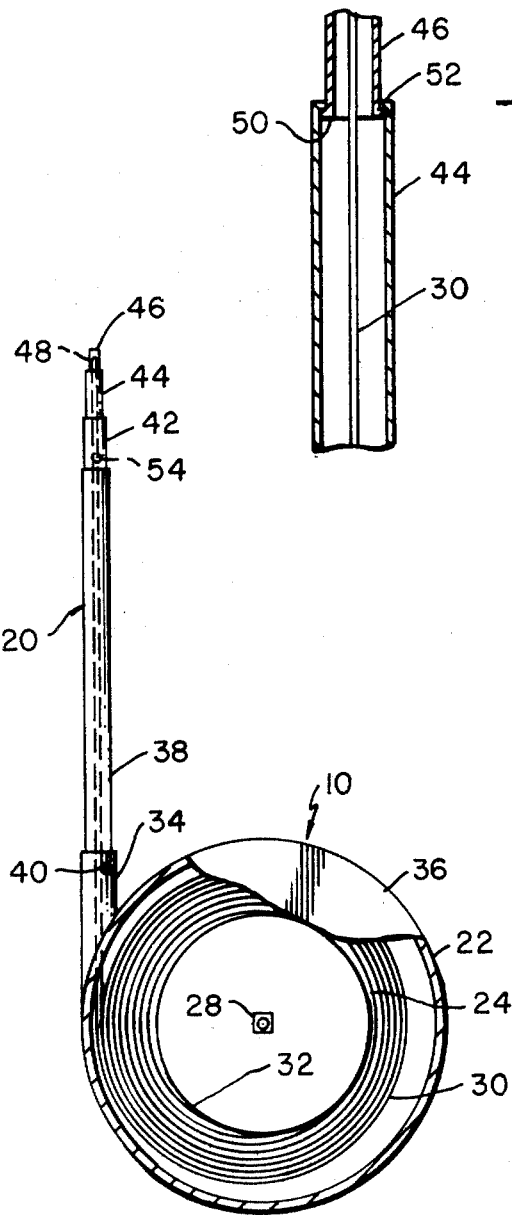
FIG.3
FIG.2
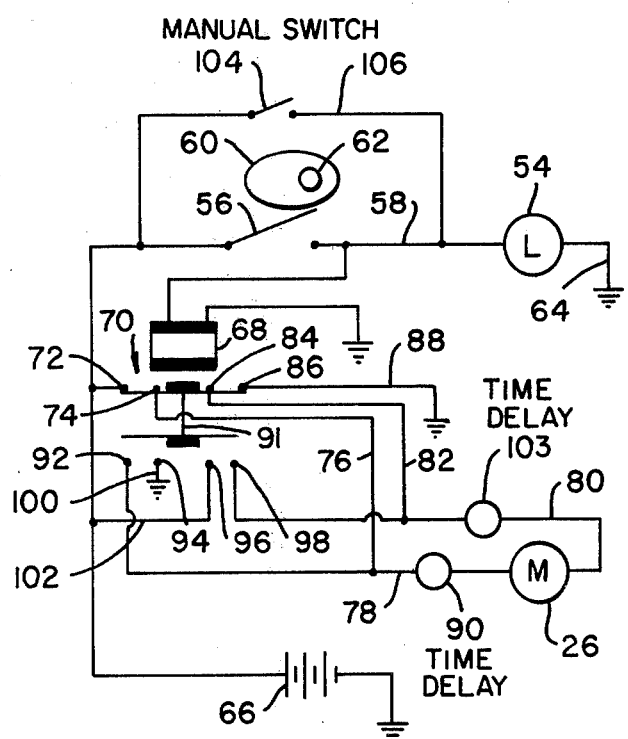
FIG.4

4,152,694

GUIDE FOR AIDING IN BACKING-UP VEHICLES

BACKGROUND OF THE INVENTION

As is well known, it is difficult to back-up vehicles because the driver does not have a clear view of the rear of the vehicle. Normally the driver's view is restricted to the use of his rear view mirror or to the view which he may obtain by turning his head towards the rear of the vehicle. In either case, the driver's view of the right rear fender portion is obstructed by the roof structure of the vehicle. This area is frequently referred to as a "blind spot."

Alleviation of this blind spot is particularly desirable when backing a vehicle into a parking spot. Frequently, the vehicle must be backed into a space which exists between two previously parked vehicles. It is difficult to back a vehicle into such a limited space. In attempting to park a vehicle by backing it into a space, the vehicle to the right of the driver is sometimes bumped, causing damage. While the problem of backing a vehicle into a parking space is most frequently encountered, in general, it is difficult to back-up a vehicle because of the blind spot in the general area of the right rear of the vehicle.

In accordance with the present invention, an extensible and retractable guide is provided on the right rear fender portion of the vehicle. When the vehicle transmission is placed in reverse, the guide is automatically extended to thereby give the driver an indication through the rear window of the exact location of the right rear fender portion of the vehicle. This serves as an effective visual aid in backing-up the vehicle. The guide may be lighted to provide additional visibility during the hours of darkness. In addition to actuating the guide by means of the transmission, a secondary over-ride switch may be provided for manual operation of the guide when deemed appropriate by the driver. The guide may also be converted into a secondary function of being used as an antenna for the vehicle radio. When the vehicle transmission is not in reverse, means are provided for automatically retracting the guide.

SUMMARY OF THE INVENTION

A guide to aid in backing-up of a vehicle when the vehicle transmission is in the reverse position is provided. The guide comprises a generally vertically extensible and retractable guide structure mounted on the right rear portion of a vehicle. Electrical means are provided for extending and retracting the guide structure. The electrical means include switch means. Actuating means are provided for said switch means operable to close said switch means when the vehicle transmission is in the reverse position. Closure of the switch means is operable to cause said electrical means to extend the guide structure. The actuating means is operable to open the switch means when the vehicle transmission is not in the reverse position. Opening of the switch means is operable to cause the electrical means to retract the guide structure.

IN THE DRAWINGS

FIG. 1 is a side elevational view of the right rear section of an automobile with the guide for aiding in backing-up of the vehicle illustratively mounted on the right rear fender adjacent the rear end of the vehicle in accordance with one embodiment of the present invention;

FIG. 2 is a side elevational view of the guide of FIG. 1 with portions removed for the purpose of clarity;

FIG. 3 is a sectional view of a portion of the guide; and

FIG. 4 is an electrical schematic diagram of the circuit utilized to extend and retract the guide.

Referring to FIG. 1, it will be noted that the guide 10 is mounted on the right rear fender 12 of automobile 14. The guide 10 is located adjacent the rear end 16 which is the portion of the vehicle not observable normally by the driver through the rear window 18. With the guide element 20 retracted as shown in solid lines, it is out of the way and will not interfere with normal operation of the vehicle. When the guide element 20 is extended as illustrated in dotted lines, it is readily visible through window 18 of the vehicle, thereby apprising the driver of the location of the right rear fender portion.

Referring to FIG. 2, it will be noted that the guide structure 10 includes a circular casing 22 in which is rotatably mounted a reel 24. The reel 24 is driven by means of a reversible electric D.C. motor 26 (FIG. 4) mounted therebehind. The reel 24 is driven by means of drive element 28 which in turn is driven by the electric motor 26. Speed reducing means may be provided between the motor 26 and element 28.

Wound on the reel 24 is a length of flexible cable 30. The flexible cable may be fabricated of, for example, metal or plastic material. One end 32 of cable 30 is secured to the reel 24. The other end of the cable extends through tubular structure 34 which forms an integral part of the casing 22. A cover 36 is provided on the casing to enclose the contents thereof.

A fixed tubular element 38 has one end received in tubular structure 34. The element 38 is secured in place by means of a set screw 40. Three telescoping tubular elements 42, 44, 46 are slidably received in tubular element 38. The telescoping elements 42, 44, 46 may be retracted into each other to the position illustrated in FIG. 2 or may be extended to raise the guide structure. The end 48 of cable 30 is received through the telescoping tubular elements and is secured to the upper end of element 46.

When the reel 24 is turned counterclockwise as viewed in FIG. 2 by motor 26, the cable 30 is wound onto the reel thereby pulling telescoping elements 42, 44, 46 downwardly to the retracted position illustrated in FIG. 2. When the reel 24 is driven in the clockwise direction as viewed in FIG. 2, the cable 30 is unwound from reel 24, and driven up through tubular element 38 to cause the telescoping elements to be extended. As will be noted in FIG. 3, each telescoping element has a circular collar at the lower end thereof, as the circular collar 50 of element 46. This collar extends radially outwardly. A radially inwardly extending collar is provided on the upper end of the next lower element 44. The two collars engage when the element 46 is extended to its maximum extent. This prevents separation of the telescoping elements. Additionally, after element 46 is extended, it will pull element 44 out of element 42. Similarly, when element 44 is extended to its maximum extent, it will pull element 42 out of element 38 to completely extend the guide.

The telescoping elements 42, 44, 46 are illustratively fabricated of a transparent material, such as a transparent or translucent plastic material. A light bulb 54 is provided at the upper end of element 38. This light bulb is energized upon extension of the guide. Energization of the light bulb causes the extended guide to light up thereby making it visible in the hours of darkness.

Referring now to FIG. 4, a switch 56 is provided in lead 58. The switch 56 is a normally open switch which may be depressed to the closed position by means of cam 60. The cam 60 is pivoted by means of structure 62 operably connected to the transmission gear to actuate the mechanism. Cam 60 is pivoted to close switch 56 when the vehicle transmission is placed in reverse. Instead of providing a separate switch, the conventional switch provided in vehicles for energizing the vehicle back-up lights may be utilized. The lamp 54 is provided in the lead 58. The other side of the lamp is grounded at 64. Closure of switch 56 completes the circuit through vehicle battery 66 and coil 68 of a relay 70. The relay 70 is normally in the position illustrated with contacts 72, 74 being closed to thereby connect one side of reversible electric D.C. motor 26 to battery 66 via leads 76, 78. The other side of the motor 26 is connected to ground via leads 80, 82 through closed contacts 84, 86 which are connected to ground via lead 88. In this configuration, the operation of motor 26 is such as to cause the motor to drive reel 24 in the counterclockwise direction, as viewed in FIG. 2, to cause retraction of the guide structure 20. A time delay element 90 is provided in lead 78 so that once the guide is retracted, the motor will be deenergized.

Upon closure of switch 56, coil 68 is energized, driving contact closure structure 91 away from contacts 72, 74, 84, 86 into position where contacts 92, 94, 96, 98 are closed. This results in the opposite polarity being applied to motor 26 with leads 78, 100 connecting the opposite side of motor to ground and leads 80, 102 connecting the other side of the motor to the other side of battery 66. This results in the motor 26 operating in the reverse direction with consequent extension of the guide 20, as illustrated in FIG. 1, and turning on of lamp 54. A time delay element 103 is provided in lead 80 to cause deenergization of the motor 26 after sufficient time for extension of the guide structure.

A manually operable switch 104 is provided in lead 106 across switch 56. Switch 104 may be manually closed to result in extension of the guide structure 20. This is desirable to permit independent operation of the guide structure during periods when the vehicle transmission is not in reverse. The switch 104 may, for example, be incorporated into the vehicle radio and the guide structure 20 may be utilized as an antenna for the vehicle radio.

What I claim as my invention is:

1. A guide to aid in backing-up a vehicle when the vehicle transmission is in the reverse position comprising generally vertically extensible and retractable guide structure mounted on the right rear portion of a vehicle, electrical means for extending and retracting said guide structure, said electrical means including switch means, actuating means for said switch means operable to close said switch means automatically when the vehicle transmission is in the reverse position, closure of said switch means operable to cause said electrical means to extend the guide structure, said actuating means operable to open said switch means automatically when the vehicle transmission is not in the reverse position, opening of said switch means operable to cause said electrical means to retract the guide structure.

2. A guide as defined in claim 1, further characterized in the provision of manually operable switch means connected across said aforementioned switch means, said manually operable switch means, upon being opened or closed, being effective to cause actuation of said electrical means in the same manner as said aforementioned switch means.

3. A guide as defined in claim 2, wherein said electrical means comprises a reversible D.C. electric motor.

* * * * *